US010613859B2

(12) United States Patent
Tran

(10) Patent No.: US 10,613,859 B2
(45) Date of Patent: Apr. 7, 2020

(54) TRIPLE-PASS EXECUTION USING A RETIRE QUEUE HAVING A FUNCTIONAL UNIT TO INDEPENDENTLY EXECUTE LONG LATENCY INSTRUCTIONS AND DEPENDENT INSTRUCTIONS

(71) Applicant: Synopsys, Inc., Mountain View, CA (US)

(72) Inventor: Thang Tran, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 206 days.

(21) Appl. No.: 15/240,993

(22) Filed: Aug. 18, 2016

(65) Prior Publication Data

US 2018/0052684 A1 Feb. 22, 2018

(51) Int. Cl.
*G06F 9/30* (2018.01)
*G06F 9/38* (2018.01)

(52) U.S. Cl.
CPC ........ *G06F 9/3001* (2013.01); *G06F 9/30043* (2013.01); *G06F 9/3802* (2013.01)

(58) Field of Classification Search
CPC ...... G06F 7/57; G06F 9/30043; G06F 9/3001; G06F 9/3842; G06F 9/3836; G06F 9/3838; G06F 9/3802
USPC ........................................................ 712/216
See application file for complete search history.

(56) References Cited

U.S. PATENT DOCUMENTS

| 5,274,790 | A | | 12/1993 | Suzuki |
| 5,333,284 | A | * | 7/1994 | Nugent ............... G06F 9/30043 712/218 |
| 5,463,745 | A | | 10/1995 | Vidwans et al. |
| 5,471,591 | A | | 11/1995 | Edmondson et al. |
| 5,519,864 | A | | 5/1996 | Martell et al. |
| 5,584,038 | A | | 12/1996 | Papworth et al. |
| 5,675,758 | A | * | 10/1997 | Sowadsky ........... G06F 9/30032 712/216 |
| 5,684,971 | A | | 11/1997 | Martell et al. |
| 5,761,476 | A | | 6/1998 | Martell |
| 5,948,098 | A | * | 9/1999 | Leung .................. G06F 9/3001 712/1 |
| 5,987,620 | A | | 11/1999 | Tran |
| 6,076,145 | A | | 6/2000 | Iwata et al. |
| 6,108,769 | A | | 8/2000 | Chinnakonda et al. |
| 6,112,019 | A | * | 8/2000 | Chamdani ............. G06F 9/3836 712/214 |
| 6,205,543 | B1 | | 3/2001 | Tremblay et al. |
| 6,233,599 | B1 | | 5/2001 | Nation et al. |
| 6,247,094 | B1 | | 6/2001 | Kumar et al. |
| 6,272,520 | B1 | | 8/2001 | Sharangpani et al. |
| 6,341,301 | B1 | | 1/2002 | Hagan |

(Continued)

*Primary Examiner* — Aimee Li
*Assistant Examiner* — Shawn Doman
(74) *Attorney, Agent, or Firm* — Fenwick & West LLP

(57) ABSTRACT

An execution pipeline architecture of a microprocessor employs a third-pass functional unit, for example, third-level of arithmetic logic unit (ALU) or third short-latency execution unit to execute instructions with reduced complexity and area cost of out-of-order execution. The third-pass functional unit allows instructions with long latency execution to be moved into a retire queue. The retire queue further includes the third functional unit (e.g., ALU), a reservation station and a graduate buffer. Data dependencies of dependent instructions in the retire queue is handled independently from the main pipeline.

21 Claims, 6 Drawing Sheets

(56) References Cited

U.S. PATENT DOCUMENTS

| | | |
|---|---|---|
| 6,408,325 B1 | 6/2002 | Shaylor |
| 6,425,072 B1 | 7/2002 | Meier et al. |
| 6,557,078 B1 | 4/2003 | Mulla et al. |
| 6,697,939 B1 | 2/2004 | Kahle |
| 6,785,803 B1 | 8/2004 | Merchant et al. |
| 7,143,243 B2 | 11/2006 | Miller |
| 7,434,032 B1 | 10/2008 | Coon et al. |
| 7,610,473 B2 | 10/2009 | Kissell |
| 7,644,221 B1 | 1/2010 | Chan et al. |
| 9,348,595 B1 | 5/2016 | Mizrahi et al. |
| 2001/0056456 A1 | 12/2001 | Cota-Robles |
| 2002/0083304 A1 | 6/2002 | Leenstra et al. |
| 2003/0005263 A1 | 1/2003 | Eickemeyer et al. |
| 2003/0005266 A1 | 1/2003 | Akkary et al. |
| 2003/0033509 A1 | 2/2003 | Leibholz et al. |
| 2003/0061467 A1 | 3/2003 | Yeh et al. |
| 2004/0015684 A1 | 1/2004 | Peterson |
| 2004/0139306 A1 | 7/2004 | Albuz et al. |
| 2004/0172523 A1* | 9/2004 | Merchant ............ G06F 9/383 712/228 |
| 2004/0243764 A1 | 12/2004 | Miller |
| 2005/0044327 A1 | 2/2005 | Howard et al. |
| 2005/0125802 A1 | 6/2005 | Wang et al. |
| 2005/0149936 A1 | 7/2005 | Pilkington |
| 2005/0273580 A1 | 12/2005 | Chaudhry et al. |
| 2006/0117316 A1 | 6/2006 | Cismas et al. |
| 2007/0136562 A1 | 6/2007 | Caprioli et al. |
| 2007/0204137 A1* | 8/2007 | Tran ............... G06F 9/30181 712/214 |
| 2007/0266387 A1 | 11/2007 | Henmi |
| 2008/0082755 A1 | 4/2008 | Kornegay et al. |
| 2008/0295105 A1 | 11/2008 | Ozer et al. |
| 2009/0037698 A1 | 2/2009 | Nguyen |
| 2010/0031268 A1 | 2/2010 | Dwyer et al. |
| 2010/0082945 A1 | 4/2010 | Adachi et al. |
| 2010/0083267 A1 | 4/2010 | Adachi et al. |
| 2010/0138608 A1 | 6/2010 | Rappaport et al. |
| 2010/0250902 A1* | 9/2010 | Abernathy ........... G06F 9/3824 712/216 |
| 2011/0067034 A1 | 3/2011 | Kawamoto |
| 2011/0296423 A1 | 12/2011 | Elnozahy et al. |
| 2012/0054447 A1 | 3/2012 | Swart et al. |
| 2012/0173818 A1 | 7/2012 | Martin |
| 2012/0278596 A1 | 11/2012 | Tran et al. |
| 2012/0303936 A1* | 11/2012 | Tran .................. G06F 9/3824 712/208 |
| 2013/0290639 A1 | 10/2013 | Tran et al. |
| 2013/0297912 A1 | 11/2013 | Tran et al. |
| 2013/0297916 A1 | 11/2013 | Suzuki et al. |
| 2013/0339619 A1* | 12/2013 | Roy .................... G06F 9/3808 711/133 |
| 2014/0047215 A1* | 2/2014 | Ogasawara ......... G06F 9/30079 712/205 |
| 2014/0109098 A1 | 4/2014 | Sato et al. |
| 2014/0189324 A1 | 7/2014 | Combs et al. |
| 2014/0372732 A1 | 12/2014 | Fleischman et al. |
| 2015/0220347 A1 | 8/2015 | Glossner et al. |
| 2016/0004534 A1* | 1/2016 | Padmanabha ......... G06F 9/3836 712/229 |
| 2016/0246728 A1 | 8/2016 | Ron et al. |
| 2016/0291982 A1 | 10/2016 | Mizrahi et al. |
| 2016/0306633 A1 | 10/2016 | Mizrahi et al. |
| 2017/0046164 A1* | 2/2017 | Madhavan ........... G06F 9/3861 |
| 2017/0168949 A1 | 6/2017 | Jackson et al. |

* cited by examiner

TRIPLE-PASS EXECUTION USING A RETIRE QUEUE HAVING A FUNCTIONAL UNIT TO INDEPENDENTLY EXECUTE LONG LATENCY INSTRUCTIONS AND DEPENDENT INSTRUCTIONS

TECHNICAL FIELD

The present disclosure relates generally to processing devices and more particularly relates to data dependency management at a processing device.

BACKGROUND

Generally, for a particular instruction, a microprocessor takes a certain number of clock cycles to complete its operation and produce a result. Microprocessors that implement a pipeline architecture use instruction pipelines to allow overlapping execution of multiple instructions. Processing overlapping instructions allows the microprocessor pipeline to continue execution while other pipelined instructions are being executed by various pipeline stages.

For microprocessors that use a pipeline architecture, pipelined instructions experience some amount of latency. Latency may be represented by the number of microprocessor clock cycles that occur from the time the instruction enters the instruction pipeline until the instruction generates a result. For some deterministic operations, the processing latency can be determined prior to execution of the instruction. Using the predetermined processing latency, the designer can construct an instruction pipeline to accommodate the processing latency of a particular instruction. Other types of instructions, however, do not take a data dependent amount of time to execute (i.e., no predetermined processing latency). These types of instructions, however, are typically not implemented as pipelined instructions because it is unknown when the instructions will produce a result. These limitations, in turn, reduce the processing efficiency for certain operations.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1A:
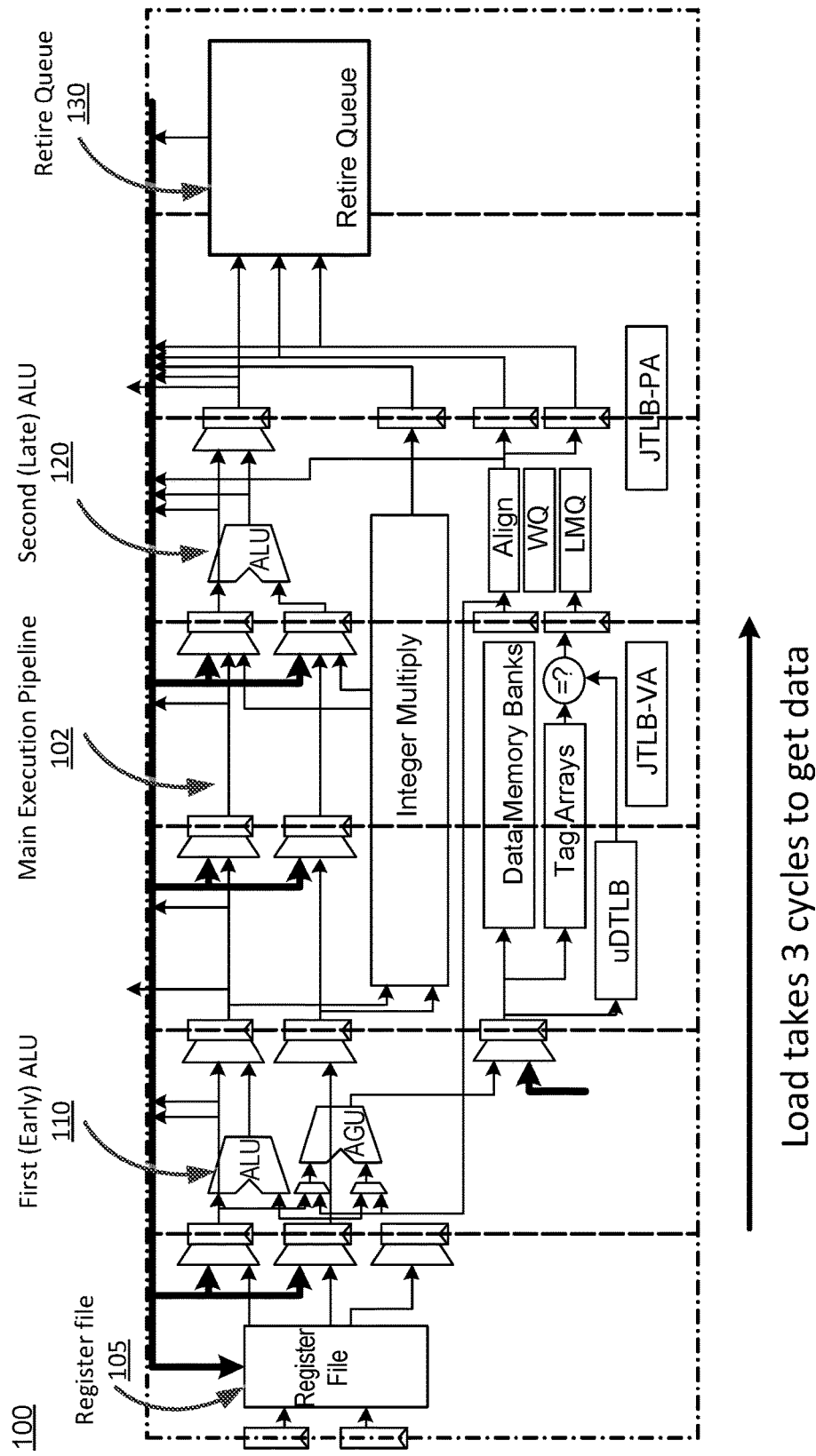
FIG. 1A illustrates an example pipeline architecture of a microprocessor implemented with a retire queue, according to one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

Embodiments of the disclosure includes a microprocessor with a pipeline architecture that employs a type of third-pass instructions that include a third-level of arithmetic logic unit (ALU) or a third-level of short-latency execution unit to execute instructions with reduced complexity and area cost of out-of-order execution. ALU instructions are referred to throughout the description but the disclosure is not limited to such instructions and the instructions referred to herein may also refer to all single-cycle execution instructions except for branch instructions. Examples of single-cycle execution instructions are ALU, shift, rotate, test, and set instructions. Branch instructions that change the flow of execution by misprediction should remain in the main execution pipeline. Instructions that set conditions for branch instructions should also remain in the main execution pipeline. These instructions are identified during decoding regarding whether they can be retired to retire queue.

In particular, a microprocessor employs a main execution pipeline architecture to allow for execution of multiple instructions that may be overlapping with each other in time; the design of a third ALU as described here includes a mechanism to move all instructions with long latency execution into a retire queue. The retire queue (RQ) as described here further includes the third ALU, a reservation station (RS) and a graduate buffer (GB). Instructions that cannot change the flow of control of instruction sequence can be moved into the retire queue. These instructions include but are not limited to: load/store with L2 cache miss, divide and floating point instructions, custom instructions with long latency, and ALU instructions. These instructions can move to the retire queue after possible exceptions are resolved. As one example of an exception that should be resolved, a divide instruction cannot execute a divide-by-0 instruction. As another example, a load/store instructions cannot have translation lookaside buffer miss exception (TLB-miss exception). Since these instructions are moved to the retire queue, they do not block and stall executions of subsequent instructions in the main pipeline. Additionally, such an addition to the pipeline may reduce latency in the pipeline considerably but does not add significant complexity or power usage in the circuit design due to the relatively simple structure of the circuit. The mechanism to handle the data dependencies of dependent instructions in the retire queue is independent from the main pipeline.

A further understanding of the nature and advantages of the present disclosure may be realized by reference to the remaining portions of the specification and the drawings.

Example Pipeline Architecture of a Microprocessor

FIG. 1A illustrates an example pipeline architecture 100 of a processor implemented with a retire queue, according to one embodiment. The pipeline architecture may include a main execution pipeline 102, a register file 105, a first arithmetic logic unit (ALU) 110, a second ALU 120, a retire queue 130 and additional components.

The first ALU 110 refers to a first-level ALU of the pipeline structure, in which case, instructions (e.g., ALU instructions) are first processed in the first-level ALU. Similarly, the second ALU 120 refers to a second-level ALU that processes instructions with a lower priority compared with the first-level ALU. In one embodiment, some instructions that are waiting at the first ALU 110 are provided to the second ALU 120 for execution to reduce latency. For example, these instructions may require a load from the level 1 (L1) cache. For the first ALU 110 and the second ALU 120, only one ALU is separately shown to simplify the description. In alternative embodiments not shown, the first-level ALU can include multiple individual ALUs and the second-level ALU can include multiple ALUs.

The retire queue 130 may become a buffer for instructions with long latency and for instructions that are dependent on these long latency instructions, and is further described below with reference to FIG. 1B.

Example Retire Queue

Figure 1B:
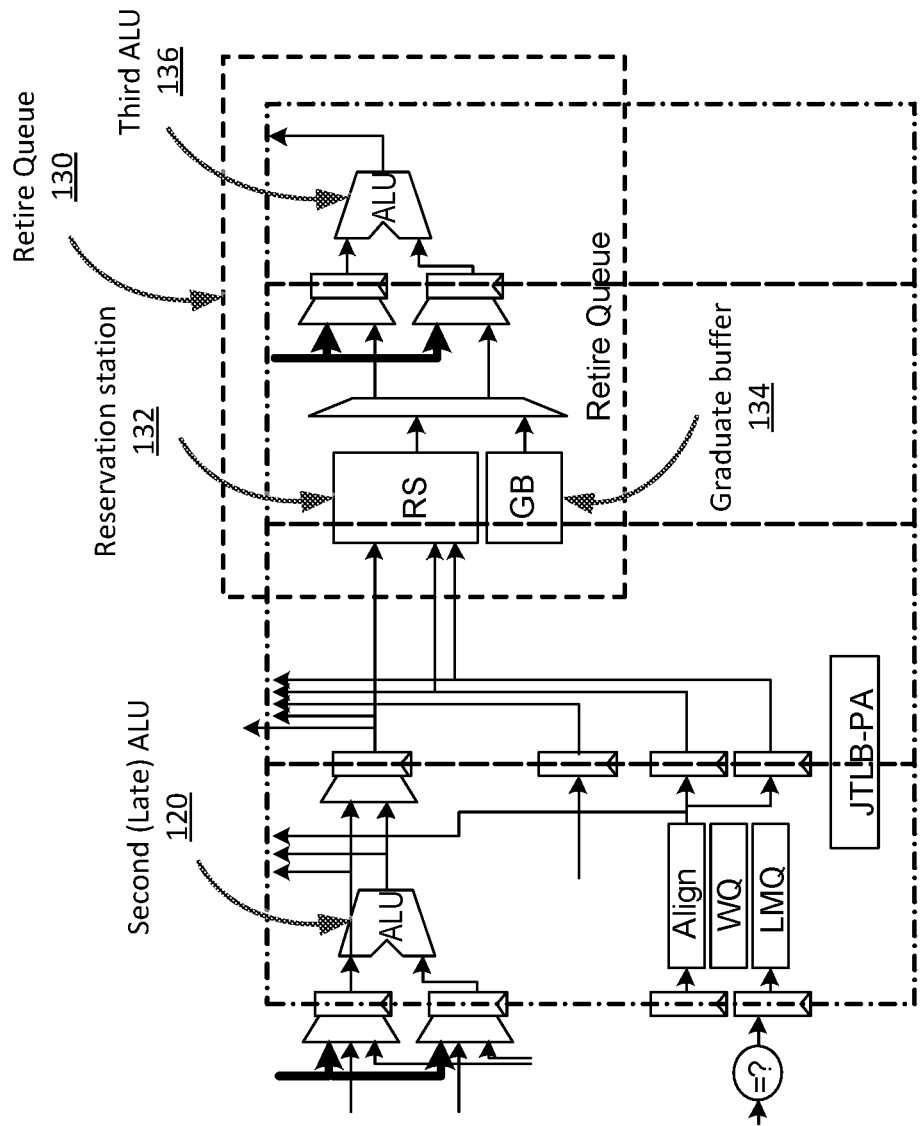
FIG. 1B illustrates the retire queue including a third ALU, a reservation station and a graduate buffer, according to one embodiment.

FIG. 1B is a block diagram illustrating the retire queue 130 in additional detail, according to one example embodiment. The retire queue 130 includes a third ALU 136, a reservation station 132 and a graduate buffer 134. The reservation station 132 and the graduate buffer 134 store different kinds of long-latency instructions and/or data. The third ALU 136 processes instructions and data from the reservation station 132 and the graduate buffer 134.

In more detail, the reservation station 132 is a buffer that stores ALU instructions. In one example embodiment, for each entry, the reservation station 132 includes source operand data for the corresponding ALU instruction and information about dependency indication(s) for the instruction. The information about dependency indication(s) may include a data dependency. A data dependency indicates relationship in terms of dependency of different data for the instruction, such that an instructions includes a source operand data for a current instruction that may depend on the result data of another instruction. Additionally, the dependency indication stored in the reservation station 132 is independent with the main execution pipeline 102 shown in FIG. 1A.

In one embodiment, the reservation station 132 can be implemented as a First-in-First-Out (FIFO) structure where instructions are executed in order by the third ALU 130, as more fully described below. In another embodiment, multiple queues or an out-of-order execution pipeline can also be implemented. The source operand data and the instructions stored in the reservation station 132 are provided to and processed by the third ALU 136, as described below.

The graduate buffer 134 is a buffer that stores long-latency instructions. Examples of long-latency instructions include load/store instructions with cache misses (e.g., level 2 (L2) cache miss), divide instructions, floating point instructions, and custom instructions with long-latency. The instructions stored in the reservation station 132 may have data dependencies on instructions that are also stored in the graduate buffer 134, for example, a previous instruction. The "previous instruction" refers to an instruction, the result data of which is needed for another instruction for execution. Instructions are required to be executed in a program order if there is data dependency between the instructions. The "previous instruction" is the earlier instruction in the program sequence and the subsequent instruction with data dependency on previous instruction can only execute when result data of previous instruction is available. This depended instruction can be a next instruction or can include a different number of instructions later in the program sequence. In some embodiments, the main execution pipeline 102 uses a scoreboard to keep track of the dependency indication stored in graduate buffer 134. The instructions stored in graduate buffer 134 are provided to and processed by the third ALU 136, as described below.

The third ALU 136 refers to a third-level ALU that processes long-latency instructions received from reservation station 132 and graduate buffer 134. Only one ALU is shown for the third ALU 136 to simplify the description. In alternative embodiments not shown, multiple ALUs can be included in the third-level ALU to process long-latency instructions independent with the main pipeline execution. The third ALU 136 has improved performance reducing traffic and complexity in the main execution pipeline 102 with low cost of power and area.

In one embodiment, after a current instruction is processed by the third ALU 136, the result data of the current instruction is output to the reservation station 132 as source operation data for a next instruction stored in the reservation station 132 (that may have a data dependency on the current instruction). In one embodiment, the result data of an instruction in the graduate buffer 134 returning from long-latency functional unit is forwarded as source operand data for a next instruction stored in the reservation station 132. The long latency functional units are discussed above as the level 2 cache, floating point unit, integer divide unit, or custom functional unit. In another example embodiment, after a current instruction is processed by the third ALU 136, the result data of the current instruction is output to the register file 105 shown in FIG. 1A.

Although the embodiments here have been primarily described with regards to an ALU for ease of understanding, in other embodiments the ALU may be a different functional unit, such as a functional unit executing custom vendor specific instructions.

Such a system as described above has various advantages. The implementation of the third-pass ALU improves performances of instruction processing of the pipeline architecture in different aspects, particularly for dependent instructions.

First, with the graduate buffer storing long-latency instructions and reservation station storing ALU instructions only, dependent instructions are no longer stalled in the main pipeline, which allows more instructions to be pushed into and to be processed through the main execution pipeline. In particular, the implementation of the third-pass ALU solves problems with many data cache misses and effectively reduces cycle penalty.

Additionally, data dependency related to the third-pass ALU is independent from the main pipeline execution, which enables minimal increase in complexity for the main execution pipeline. The relatively small area and low power for implementing the third-pass ALU also allows performance improvement of the execution pipeline at a low cost.

Example Multi-Pipeline Architecture with a Retire Queue

Figure 1C:
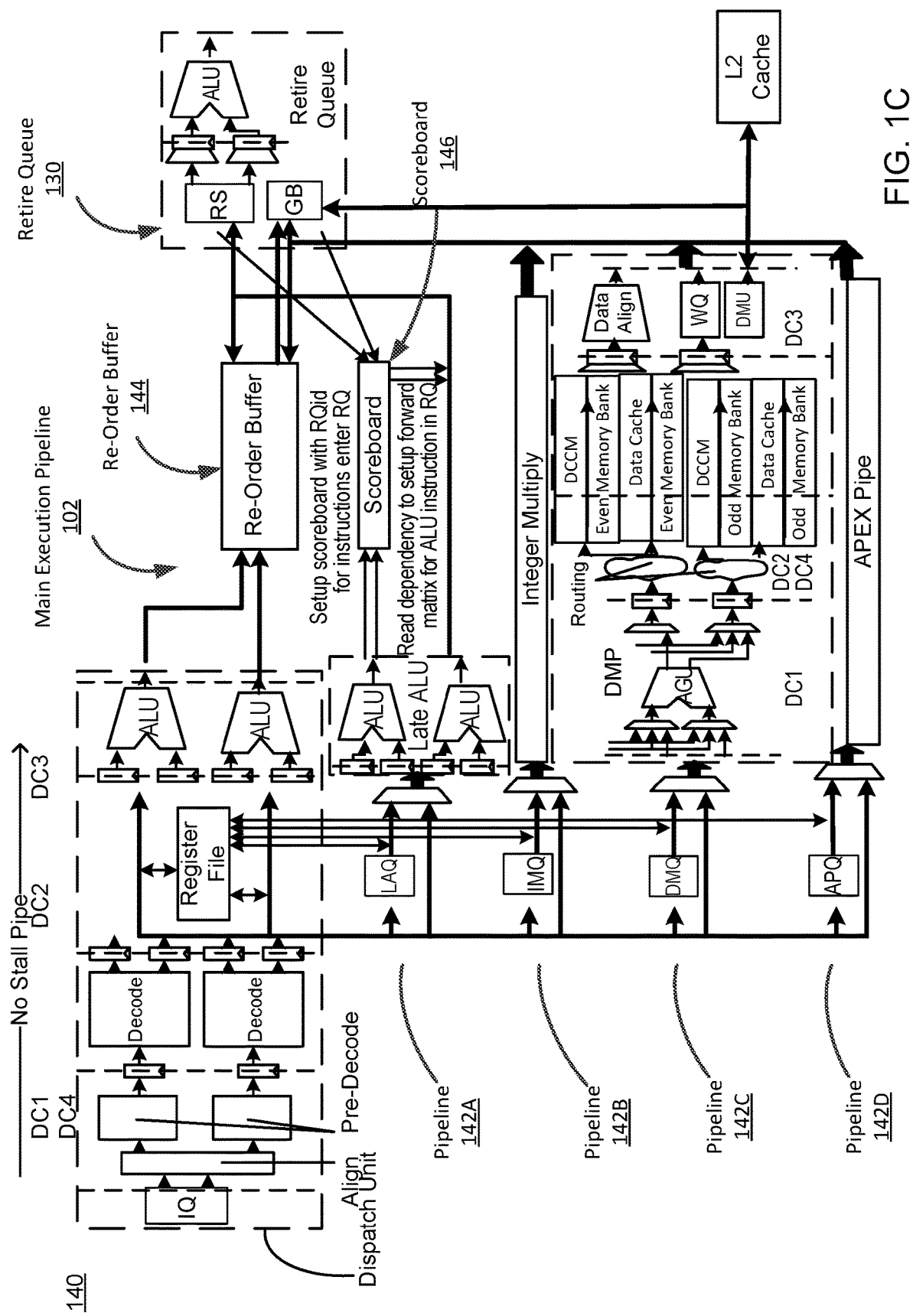
FIG. 1C illustrates an example multi-pipeline architecture of a microprocessor implemented with the retire queue, according to one embodiment.

FIG. 1C illustrates an example multi-pipeline architecture 140 of a microprocessor implemented with the retire queue 130, according to one embodiment. In FIG. 1C, the multi-pipeline architecture 140 includes a main execution pipeline 102 that further includes multiple pipelines 142A-142D with parallel execution. The multiple pipelines 142A-142D may serve different purposes or functions. The multi-pipeline architecture 140 also includes a retire queue 130 that stores and processes long-latency instructions and relevant operand data, as described above in FIG. 1B. The long-latency instructions that are received originally by the multiple pipelines 142A-142D are directed to the retire queue 130 and are processed by the retire queue independent with the multiple pipelines 142A-142D.

The multi-pipeline architecture 140 also includes a re-order buffer 144 and a scoreboard 146. In some embodiments, the re-order buffer 144 stores different kinds of data such as operand data and result data for an instruction, and in particular, when the instruction can retire, the result data is written into the register file 105.

The scoreboard 146 keeps track of any dependency indications for the retire queue 130. In one embodiment, when an instruction enters the retire queue 130, the scoreboard 146 is set up to record information of the instruction, for example, information of the operation data and dependency indication of the instruction. For each source operand or flag operand, the instruction (e.g., ALU instruction) accesses the scoreboard 146 to acquire information of retire queue dependency. The retire queue dependency refers to dependency information about whether the instruction depends only on instructions stored in retire queue 130 or depends on at least one instruction in the main execution pipeline 102 instead of in the retire queue. If the retire queue dependency shows that the instruction depends only on the instructions stored in the retire queue 130, the instruction can be sent to the reservation station 132. As the instruction is sent to the reservation station 132, a forwarding bit is set. The forwarding bit can be used in a data dependency matrix to indicate where/which functional unit a result operand is to be forwarded. In one embodiment, output of long latency instructions is transmitted to a data dependency matrix, and the data dependency matrix indicates data dependency between a long latency instruction and a third-pass instruction. The data dependency matrix indicates that a source operand data of the third-pass instruction depends on a result data of a long-latency instruction.

Example Flow Chart

Figure 1D:
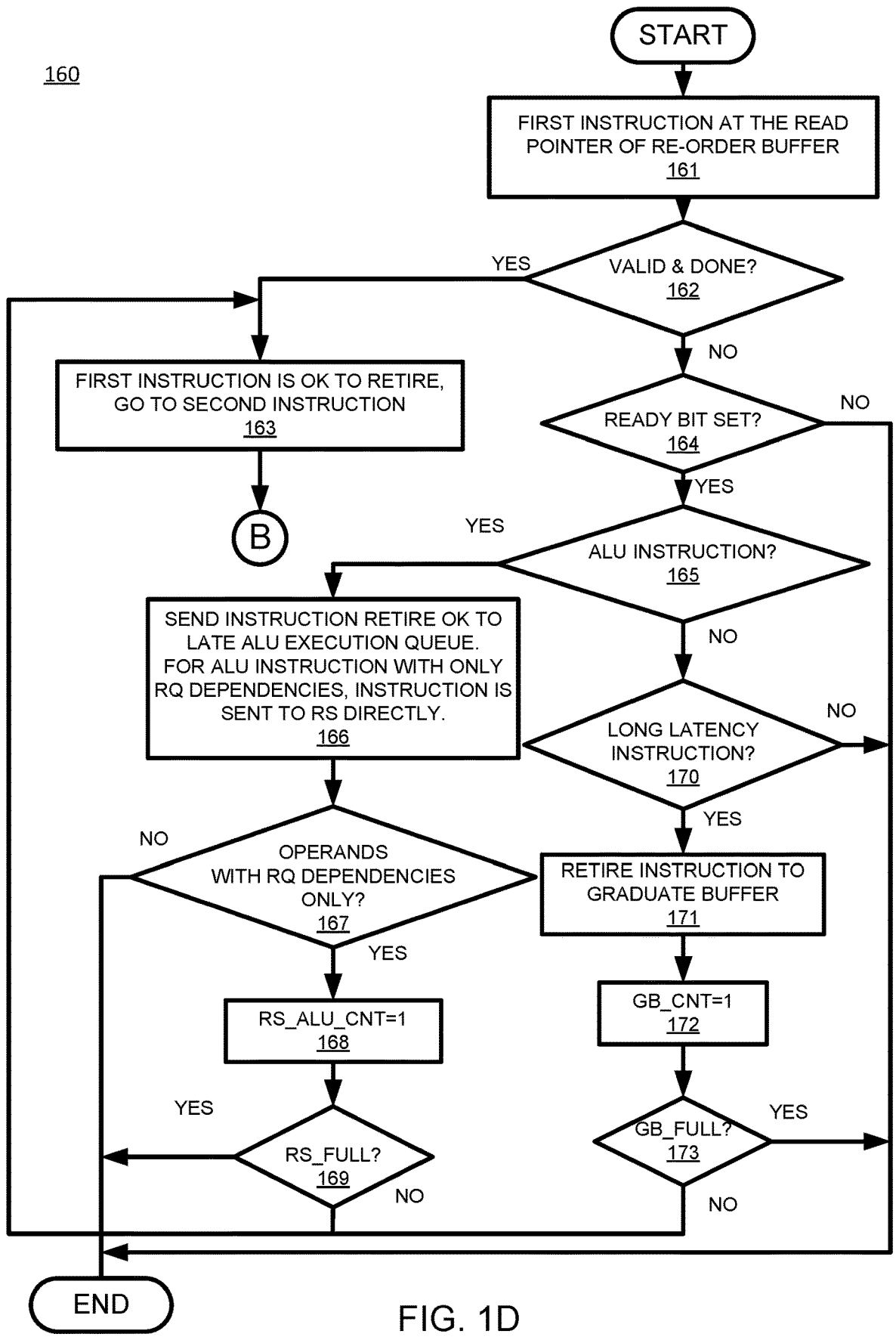
FIG. 1D illustrates a flow chart showing a process of processing a first instruction with the retire queue, according to one embodiment.

FIG. 1D illustrates a flow chart showing a process of processing a first instruction with the retire queue, according to one embodiment. In one embodiment, the process described here is executed by the microprocessor described with reference to FIGS. 1A-1C. As shown in FIG. 1D, initially, for an instruction 161 (a first instruction) that is at the read pointer of re-order buffer 144, indicating the current instruction is ready for the process, a valid bit for this instruction is checked 162, which indicates whether this instruction can retire to the register file 105. If the valid bit shows the current instruction is finished and its result data can retire 163 to register file 105, a next instruction is evaluated through a process of a flow chart 180 similar to the process illustrated by the flow chart 160, as described below in FIG. 1E.

Returning to 162, if the valid bit shows the current instruction cannot retire, the ready bit is checked 164. The ready bit indicates the instruction cannot generate an exception, for examples, a divide instruction cannot have a divide-by-zero exception, and a load/store instruction cannot have TLB miss exception. If the ready bit is set, the current instruction is checked 165 to evaluate whether it belongs to an ALU instruction. If the ready bit is not set, the process ends. If the current instruction belongs to an ALU instruction and that the instruction has only retire queue dependency, the instruction is directly sent 166 to reservation station 132 if only retire queue dependencies exist. In addition, the instruction is also checked 167 whether it has only retire queue dependency. If the instruction has only retire queue dependency, an RS_ALU_CNT bit is set 168 as "1", which indicates that this instruction is sent to and stored in the reservation station 132. A RS_FULL bit is checked 169, which indicates whether the reservation station 132 is full. If the RS_FULL shows the reservation station 132 is full, the process ends. If the RS_FULL shows the reservation station 132 is not full, the process returns to 163, and a next instruction is evaluated 163 with a similar process being executed, as described below in FIG. 1E.

Returning to 167, if the instruction has other dependencies aside from dependencies to instructions in the retire queue, the process ends.

Returning to 165, if the current instruction does not belong to an ALU instruction, the instruction is further evaluated 170 to show whether it belongs to a long-latency instruction. If the current instruction does not belong to a long-latency instruction, the process ends, indicating the instruction should not, and will not, be handled by the retire queue 130 and not be processed by the graduate buffer 134

Returning to 170, if the current instruction belongs to a long-latency instruction, the instruction is retired 171 to the graduate buffer 134, and a GB_CNT bit is set as "1", indicating the instruction is sent to the graduate buffer. Then a GB_FULL bit is checked 173 to show whether the graduate buffer 134 is full after receiving the current instruction. If GB_FULL shows that the graduate buffer 134 is full, the process ends. If GB_FULL shows the graduate buffer is not full yet, the process goes back to 163, and a next instruction is evaluated 163 with a similar process being executed, as described below in FIG. 1E.

Figure 1E:
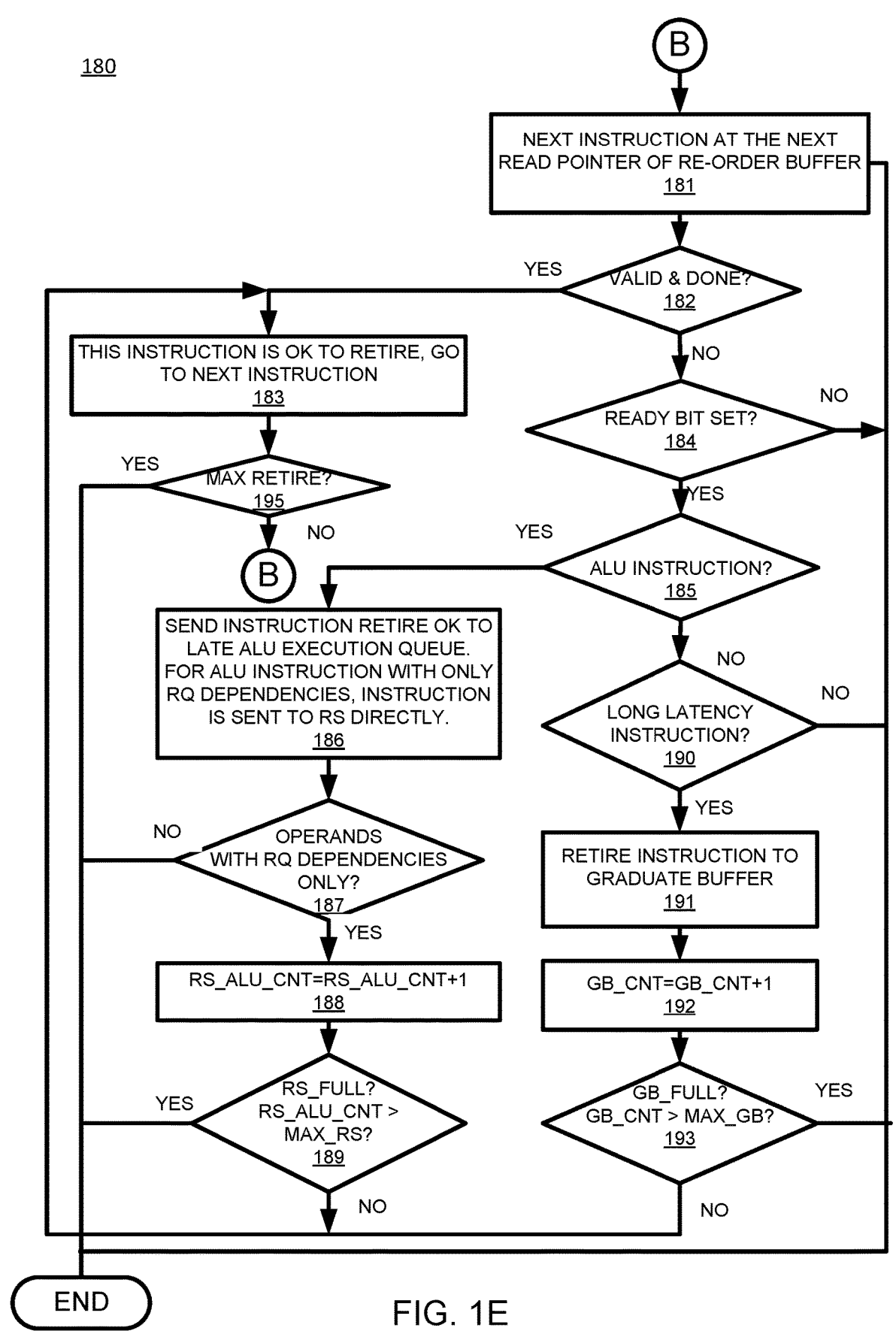
FIG. 1E illustrates a flow chart showing a process of processing a next instruction with the retire queue, according to one embodiment.

FIG. 1E illustrates a flow chart showing a process of processing a next instruction with the retire queue, according to one example embodiment. In some example embodiments, the process 180 is executed in response to 163 of the process 160 shown in FIG. 1D, and the instruction evaluated in the process 180 is the next instruction that depends on the first instruction illustrated in FIG. 1D.

In more detail, initially, for the current instruction 181 (the next instruction related to the first instruction in FIG. 1D) that is at the read pointer of re-order buffer 144, indicating the current instruction is ready for the process 180, a valid bit for this instruction is checked 182, which indicates whether this instruction can retire to the register file 105. If the valid bit shows the current instruction is finished and its result data can retire 183 to register file 105, a next instruction will be evaluated. A limit regarding a maximum number of entries in the retire queue is checked 195. If the maximal limit is met, the process ends. If the maximal limit is not met yet, a next instruction is evaluated through the same process in the flow chart 180.

Returning to 182, if the valid bit shows the current instruction cannot retire, the ready bit is then checked 184. If the ready bit is set, the current instruction is checked 185 to evaluate whether it belongs to an ALU instruction. If the ready bit is not set, the process ends. If the current instruction belongs to an ALU instruction and that the instruction has only a retire queue dependency, the instruction is directly sent 186 to reservation station 132. The instruction also may be checked 187 as to whether it has only retire queue dependency. If the instruction has only a retire queue dependency, the RS_ALU_CNT bit is added 188 by one, which indicates that one more instruction, the current instruction, is sent to and stored in the reservation station 132. Both the RS_FULL bit and the RS_ALU_CNT bit are checked 189, which indicate whether the reservation station 132 is full and whether the number of instructions stored in the reservation station is within a threshold limit of the reservation station. If either the RS_FULL shows the reservation station 132 is full or RS_ALU_CNT shows the maximal limit of the reservation station is met, the process ends. If either the reservation station 132 is not full or the maximal limit of the reservation station is not met, the microprocessor determines whether the result data can retire 183 to register file 105 and whether a next instruction will be evaluated. Returning to 187, if the instruction has other dependency, the process ends.

Returning to 185, if the current instruction does not belong to an ALU instruction, the instruction is further evaluated 190 to show whether it belongs to a long-latency instruction. If the current instruction does not belong to a long-latency instruction, the process ends, indicating the instruction should not, and will not, be handled by the retire queue 130 and should not be processed by the graduate buffer 134.

Returning to 190, if the current instruction belongs to a long-latency instruction, the instruction is retired 191 to the graduate buffer 134, and the GB_CNT bit is incremented by one, indicating one more instruction, the current instruction, is sent to and stored in the graduate buffer. Both the GB_FULL bit and the GB_CNT bit are checked 193 to show whether the graduate buffer 134 is full and whether the number of instructions stored in the graduate buffer is within a threshold limit of the graduate buffer. If either the GB_FULL shows the graduate buffer 134 is full or GB_CNT shows the maximal limit of the graduate buffer is met, the process ends. If neither the graduate buffer 134 is full nor the maximal limit of the graduate buffer is met, the process goes back to 183, and a next instruction is evaluated 183 with the same process 180 being executed.

Example Machine

Figure 2:
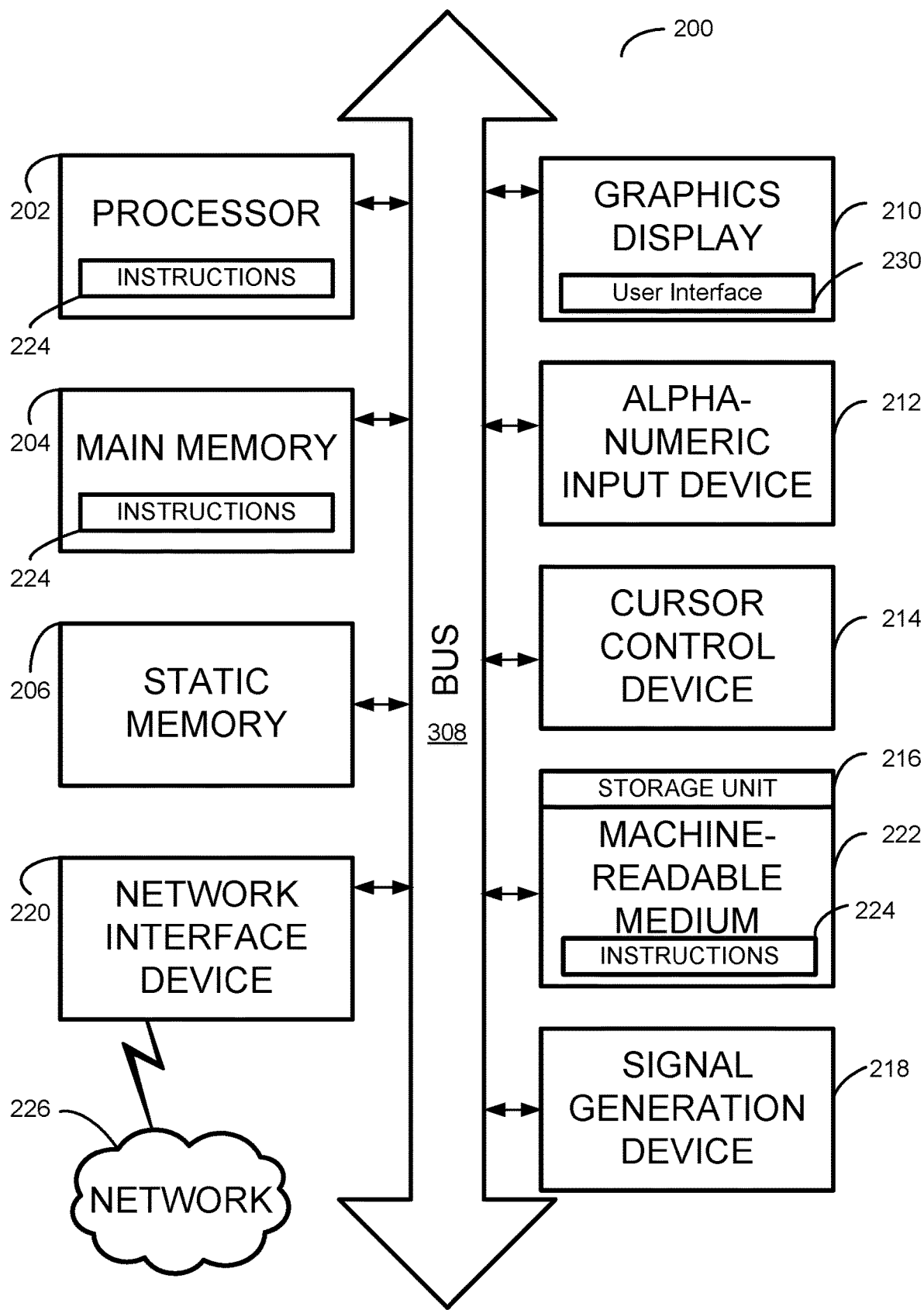
FIG. 2 is a block diagram illustrating components of a machine able to read instructions from a machine-readable medium and execute them in a processor, according to one embodiment.

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which one or more instructions 224 (e.g., software or program or program product) for causing the machine to perform any one or more of the methodologies discussed herein may be executed. The computer system 200 may be used to perform operations associated with designing a test circuit including a plurality of test core circuits arranged in a hierarchical manner. In one embodiment, the processor 202 of the example computer system 200 may be implemented with the circuits and other components described above, such as the third ALU and scoreboard.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 308. The computer system 200 may further include graphics display unit 210 (e.g., a plasma display panel (PDP), a liquid crystal display (LCD), a projector, or a cathode ray tube (CRT)) with a user interface 230. The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220. The machine-readable medium 222 may also store a digital representation of a design of a test circuit.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for detachable camera mounts as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A microprocessor including an extended pipeline stage comprising:
   a main execution pipeline processing instructions and configured to forward long latency instructions to a retire queue, the main execution pipeline including an arithmetic logic unit (ALU), the long latency instructions being instructions taking more than one cycle to execute; and
   the retire queue configured to store and execute the long latency instructions and third-pass instructions, wherein one or more of the third-pass instructions have data dependencies upon the long latency instructions, and wherein the third-pass instructions are determined to, when executed, not cause any exception events, the retire queue further comprising:
      a graduate buffer configured to store the long latency instructions;
      a reservation station configured to store the third-pass instructions and dependency indications of the third-pass instructions on the long latency instructions stored in the graduate buffer; and
      a third-pass functional unit configured to receive result data of the long latency instructions and to execute the third-pass instructions using the result data, processing of the third-pass instructions being executed independently from the instructions in the main execution pipeline, wherein the third-pass functional unit comprises one or more additional ALUs separate from the main execution pipeline and the one or more additional ALUs execute the third-pass instructions.

2. The microprocessor of claim 1, wherein the third-pass instructions include at least one of an arithmetic logic unit (ALU) instruction and a shift instruction.

3. The microprocessor of claim 1, wherein the long latency instructions and the third-pass instructions are stored in separate queues.

4. The microprocessor of claim 1, further comprising a data dependency matrix configured to forward data between a long latency instruction and a third-pass instruction.

5. The microprocessor of claim 1, further comprising a data dependency matrix configured to forward data between third-pass instructions.

6. The microprocessor of claim 1, wherein the long latency instructions are instructions that can cause a stall in the main execution pipeline.

7. The microprocessor of claim 1, wherein the long-latency instructions include at least one of load/store instructions with cache misses, divide instructions, floating point instructions, and custom instructions with long latency.

8. The microprocessor of claim 1, further comprising multiple queues with each of the multiple queues dedicated to a corresponding additional ALU.

9. The microprocessor of claim 1, further comprising:
   a register file that receives result data from the third-pass functional unit.

10. The microprocessor of claim 1, wherein the microprocessor is a component of a computer system, the computer system comprising at least one of a memory, graphics display unit, or a storage unit.

11. A method comprising:
   fetching an instruction from a main execution pipeline, the main execution pipeline includes an arithmetic logic unit (ALU);
   determining whether the instruction is a long latency instruction, wherein a long latency instruction is an instruction that, when executed, causes a stall in the main execution pipeline;
   forwarding, responsive to determining the instruction is a long latency instruction, the instruction to a graduate buffer of a retire queue, wherein the graduate buffer is configured to store the long latency instruction;
   identifying a third-pass instruction in the main execution pipeline, the third-pass instruction depending only upon one or more instructions in the retire queue, wherein the third-pass instruction is determined to, when executed, not generate an exception;
   forwarding the identified third-pass instruction to a reservation station of the retire queue, wherein the reservation station is configured to store the third-pass instructions and dependency indications of the third-pass instructions on long-latency instructions stored in the graduate buffer; and
   executing the third-pass instruction in a third-pass functional unit of the retire queue, wherein the third-pass functional unit comprises one or more additional ALUs.

12. The method of claim 11, further comprising:
   storing the long-latency instruction and the third-pass instruction in separate queues within the retire queue.

13. The method of claim 11, wherein the executing the third-pass instruction in the third-pass functional unit of the retire queue further comprises:
   determining that the third-pass instruction has no data dependency; and
   executing the third-pass instruction out-of-order.

14. The method of claim 11, further comprising:
   forwarding an output data of the third-pass functional unit to a data dependency matrix, the data dependency matrix configured to forward the output data between a long latency instruction and a third-pass instruction.

15. The method of claim 11, further comprising:
   forwarding an output data of the third pass functional unit to a data dependency matrix, the data dependency matrix configured to forward the output data between third-pass instructions.

16. The method of claim 11, wherein the long latency instruction is an instruction that causes a stall in the main execution pipeline.

17. The method of claim 11, wherein the long latency instruction includes at least one of load/store instructions with cache misses, divide instructions, floating point instructions, and custom instructions with long latency.

18. The method of claim 11, wherein the main execution pipeline further comprises multiple queues with each of the multiple queues dedicated to a corresponding additional ALU.

19. The method of claim 11, further comprising:
forwarding result data from the third-pass functional unit to a register file included in the main execution pipeline.

20. The method of claim 11, wherein the microprocessor is a component of a computer system, the computer system comprising at least one of a memory, graphics display unit, and a storage unit.

21. The method of claim 11, further comprising:
determining whether the instruction is a branch instruction, wherein the branch instruction is an instruction, that, when executed, changes the flow of execution by misprediction; and
responsive to determining the instruction is a branch instruction, executing the instruction in the main execution pipeline.

* * * * *